(12) United States Patent
Mazumdar et al.

(10) Patent No.: US 8,451,147 B2
(45) Date of Patent: May 28, 2013

(54) DATA INTERFACE CIRCUIT

(75) Inventors: Dipayan Mazumdar, Bangalore (IN);
Cyril P Raj, Bangalore (IN)

(73) Assignee: M.S. Ramaiah School of Advanced Studies, Bangalore (IN)

( * ) Notice: Subject to any disclaimer, the term of this patent is extended or adjusted under 35 U.S.C. 154(b) by 0 days.

(21) Appl. No.: 13/320,368

(22) PCT Filed: Oct. 18, 2010

(86) PCT No.: PCT/IB2010/054706
§ 371 (c)(1),
(2), (4) Date: Nov. 14, 2011

(87) PCT Pub. No.: WO2012/007799
PCT Pub. Date: Jan. 19, 2012

(65) Prior Publication Data
US 2012/0235839 A1    Sep. 20, 2012

(30) Foreign Application Priority Data
Jul. 16, 2010    (IN) .......................... 2040/CHE/2010

(51) Int. Cl.
*H03M 7/00*    (2006.01)
(52) U.S. Cl.
USPC ................. 341/50; 375/257; 379/7; 379/28; 455/557; 398/45; 398/52; 398/83; 709/233; 709/236; 370/201; 370/229; 370/386; 370/396; 370/422

(58) Field of Classification Search
USPC ................. 341/50–90; 375/257; 379/93.07, 379/93.28; 455/557; 398/45, 52, 83; 709/233, 709/236; 370/201, 229, 216, 218, 119, 381, 370/401, 437, 429, 213, 386, 396, 422
See application file for complete search history.

(56) References Cited

U.S. PATENT DOCUMENTS

| | | | | |
|---|---|---|---|---|
| 5,414,415 | A | * | 5/1995 | Ueda et al. ................. 370/395.1 |
| 5,983,260 | A | | 11/1999 | Hauser et al. |
| 7,420,968 | B2 | * | 9/2008 | Donoghue et al. ............ 370/387 |

(Continued)

FOREIGN PATENT DOCUMENTS

EP    1257099 B1    11/2002

OTHER PUBLICATIONS

Mapping and Management of Communication Services on MP-SoC Platforms, Marescaux T., Ph.D Dissertation, Technische Universiteit Eindhoven, Sep. 2007.

(Continued)

*Primary Examiner* — Lam T Mai
(74) *Attorney, Agent, or Firm* — Brundidge & Stanger, P.C.

(57) ABSTRACT

In an illustrative embodiment, a data interface circuit is provided. The data interface circuit comprises data sources, input blocks, a space switch, output blocks and a multi-core processor. The data interface circuit allows data provided in different voltage ranges and sampling frequencies to be transmitted to the appropriate core in the multi-core processor via the switch. Data conversion elements in the input blocks convert data from the data sources and having varying voltage ranges and sampling frequencies into data having a voltage range and sampling frequency suitable for the space switch. Analogously, data conversion elements in the output blocks convert data from the space switch into data having a voltage range and sampling frequency suitable for the corresponding core in the multi-core processor. In one embodiment, level shifters and FIFO buffers are used in the input blocks and output blocks.

25 Claims, 13 Drawing Sheets

U.S. PATENT DOCUMENTS

| | | | |
|---|---|---|---|
| 7,573,827 B2* | 8/2009 | Santos et al. | 370/242 |
| 7,693,142 B2* | 4/2010 | Beshai | 370/380 |
| 7,706,686 B2* | 4/2010 | Dotaro et al. | 398/47 |
| 7,769,292 B2* | 8/2010 | Sylvester et al. | 398/45 |
| 8,223,759 B2* | 7/2012 | Beshai | 370/380 |
| 2010/0189121 A1* | 7/2010 | Beshai | 370/401 |

OTHER PUBLICATIONS

Energy Scalability of On-Chip Interconnection Networks, Konstantakopoulos, T.K., Ph.D Submission, Department of Electrical Engineering and Computer Science, Massachusetts Institute of Technology, Jun. 2007.

Low-Power CMOS Digital Design, Chandrakasan et al., IEEE Journal of Solid-State Circuits, vol. 27, No. 4, Apr. 1992, pp. 473-484.

Omega Networks [online], Oct. 31, 2011 [retrieved Nov. 7, 2011]. Retrieved from the Internet<URL: http://en.wikipedia.org/wiki/Omega_network>.

Reconfigurable Shuffle Network Design in LDPC Decoders, Tang et al, Proceedings of the IEEE 17th International Conference on Applicaton-specific Systems, Architectures and Processors, 2006, pp. 81-86.

High-Performance Computer Architecture, Harold Stone, 1987, Chapter 6, Section 6.3.

International Search Report and Written Opinion prepared by the Australian Patent Office for PCT/IB2010/054706 completed Jan. 27, 2011.

* cited by examiner

DATA INTERFACE CIRCUIT

CROSS-REFERENCE TO RELATED APPLICATION

The present application claims priority to Indian patent application serial number 2040/CHE/2010, filed on Jul. 16, 2010, the entire contents of which are incorporated by reference. This present application is a U.S. National Phase Application pursuant to 35 U.S.C. §371 of International Application No. PCT/IB2010/054706 filed Oct. 18, 2010, the entire contents of which are incorporated by reference.

BACKGROUND

Multi-core processors are integrated circuits (IC) containing multiple processor cores. In general, a core is a processing unit such as a central processing unit (CPU), and processes executable modules (instructions or code) to provide one or more desired functions or applications. Multi-core processors often need to accept and process data generated by one or more external data sources such as, for example, analog-to-digital converters (ADC), sensor-arrays, etc. Simple bus-based data interface to processors may not be able to accommodate data collection from a large number of sources, especially when such data collection needs to performed in substantially parallel fashion.

SUMMARY

In an illustrative embodiment, an integrated circuit is provided. The integrated circuit comprises a plurality of input data interfaces, each of the input data interfaces connected to a variable rate data source and a data switch, each of the input data interfaces further comprising voltage level shifters and distributed first in-first out elements, a plurality of output data interfaces, each of the output data interfaces connected to one of a plurality of data consuming processors, each of the output data interfaces further comprising of voltage level shifters, distributed first in-first out elements and reorder buffers, and a first space switch and a second space switch each coupling the plurality of input data interfaces to the plurality of output interfaces and further comprising a plurality of interfaces capable of providing multiple simultaneous connections between input ports and output ports of the space switch, wherein the space switch has a number of ingress ports equal to the number of input data interfaces and a number of egress ports equal to the number of output data interfaces, wherein the bit width of each ingress port on the space switch matches the bit width of each input interface, wherein the bit width of each egress port on the space switch matches the bit width of each output interface, and wherein the second space switch is activated to replace the first space switch if the first space switch fails.

In an alternative embodiment of the integrated circuit, one or more of the data consuming processors are located on a first physical layer of silicon and connected to the corresponding output interfaces located on a second physical layer of silicon by a combination of interconnect wiring and through-silicon vias. In a further embodiment of the integrated circuit, the input data interfaces further comprises a plurality of first-in first-out (FIFO) buffers, each coupled to one of the voltage level shifters, wherein the FIFO buffers each comprises of one or more sub-blocks forming a distributed FIFO element. In another embodiment, the variable data sources and the distributed FIFO element are coupled via the voltage level shifters, and each distributed FIFO element occupies a different physical location on a silicon die, and further comprises one of more memory locations. In a further embodiment, each voltage level shifter is connected in a single ended mode where it can convert unipolar or bipolar digital signals to a voltage level compatible with the distributed FIFO elements.

In another illustrative embodiment, an integrated circuit is provided. The integrated circuit comprises a plurality of input interfaces comprising input voltage level shifters, and input distributed first-in first-out (FIFO) elements interconnected by segments of interconnects, each input interface coupled to a variable rate data source of a plurality of variable rate data sources each having the same or different logic levels, and a space switch coupled to the plurality of input interfaces providing multiple non-blocking connections to a plurality of output interfaces comprising output voltage shifters, distributed FIFO elements and reorder buffers coupled in series by interconnects.

In another embodiment, the distributed FIFO elements may be implemented on an active layer of silicon of a two dimensional integrated circuit, or on different layers of a three-dimensional silicon integrated circuit. In one embodiment, the output interfaces are coupled to data sinks which may further comprise of a plurality of multiple processor cores implemented on the same chip as the integrated circuit or on a separate chip from the integrated circuit. In another embodiment, the space switch comprises a fixed point space switch or a floating point switch, wherein the input and output interfaces of the space switch may further comprise of mantissa bits and exponent bits having bit widths greater than or equal to 1.

In a further embodiment, the data sinks may each have different supply voltages and different operating frequencies, and may comprise of individual microprocessors, digital signal processors, and field-programmable gate arrays, wherein one or more of the data sinks maybe coupled to one of the reorder buffers. In another embodiment, each individual bypassable reorder buffer of the plurality of reorder buffers may have variable depth independent of the other reorder buffers, and wherein the individual reorder buffer further comprises one input port having an address maintained by a write pointer and one or more output ports having addresses maintained by read pointers, and each reorder buffer comprises multiple output ports, each connected to a different output voltage level shifter for outputting to different output sinks.

In another embodiment, the output interface receives data comprising a first data rate and a first voltage level from the space switch and converts the first data rate to a second data rate and the first voltage level to a second voltage level, wherein the second data rate and second voltage level are compatible with the data sinks. In one embodiment, a first segment of the distributed FIFO segments is physically located on one layer of a three-dimensional integrated circuit while a second segment of the distributed FIFO segments is physically located on another layer of the three-dimensional integrated circuit, and wherein the first and second segments are connected by vertical through-silicon via interconnects.

In another embodiment, the first and second segments of the distributed FIFO segments may communicate differential signals or single-ended signals. In another embodiment, the data transmitted along the interconnects connecting the input and output distributed FIFO elements are encoded based on Gray-coding or bit-reversal encoding. In another embodiment, the space switch may comprise a cross-bar switch with N ingress ports and N egress ports, a shuffle exchange network with N ingress ports and N egress ports and having log (N) stages, or a log$_2$ (N) stage Banyan network with N ingress and N egress ports.

In another embodiment, a second space switch is implemented to switch on if the space switch fails, and wherein the second space switch is coupled to the input interface and output interface in a manner similar to how the space switch is coupled to the input interface and output interface, respectively.

In another embodiment, a distributed FIFO element of the distributed FIFO elements has a low power encoder output connected to a low power decoder input of another distributed FIFO element of the distributed FIFO elements, wherein the distributed FIFO elements are connected to the level shifters using optional lower power Gray-coded encoders and decoder, and wherein the input distributed FIFO elements can be written to by variable rate data sources through a multiplicity of parallel paths The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
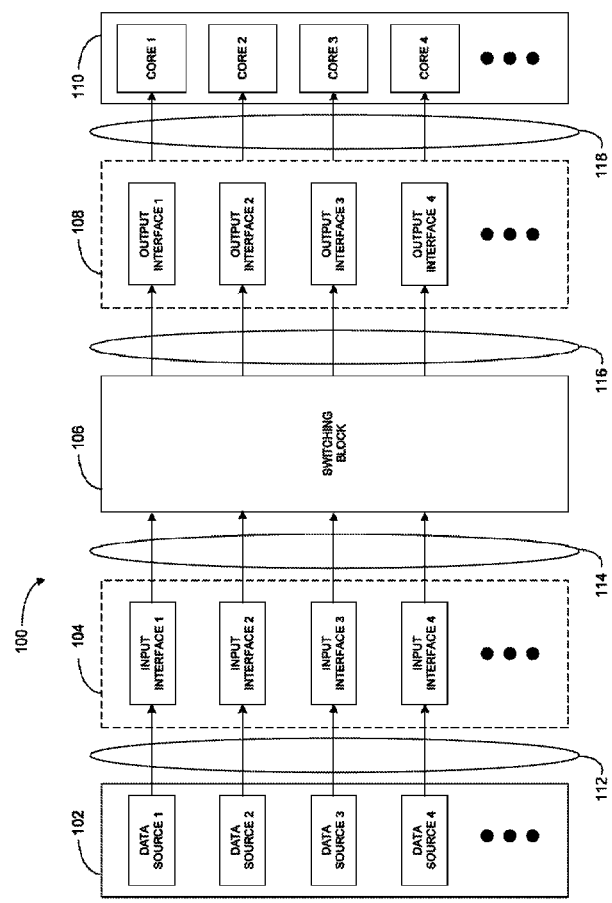
FIG. 1 shows an example embodiment of a data interface circuit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

FIG. 1 shows an example embodiment of a data interface circuit 100. The data interface circuit 100 is shown containing an array of data sources 102, input blocks 104, a switching block 106, output blocks 108 and processor blocks 110. The data sources 102 and the input blocks 104 are coupled by a data path 112. The input blocks 104 and the switching block 106 are coupled by a data path 114. The switching block 106 and the output blocks 108 are coupled by a data path 116. The output blocks 108 and the processor block 110 are coupled by a data path 118. The input blocks 104, switching block 106 and output blocks 108 may be viewed in combination as a data interface circuit to receive data from the data sources 102 via the data path 112 and to provide the data to corresponding processor blocks via the data path 118. It is noted that each of the individual paths (shown as lines, and referred to as sub-paths below) in the data paths 112, 114, 116 and 118 may contain multiple signal lines. The lines may be single ended or differential electrical signals.

In an embodiment, the processor blocks 110 are data sinks and may include a plurality of cores of a multi-core processor or a plurality of memory blocks corresponding to a multi-core processor, each respectively receiving data from a corresponding output interface block within the output blocks 108 via the data path 118. In one embodiment, the components of the data interface circuit 100 may be implemented on a single integrated circuit or FPGA. In another embodiment, the components of the data interface circuit 100 may be implemented on multiple integrated circuits or FPGAs.

The input blocks contain input interface blocks, which may include buffer blocks, each of which stores input data received from a data source via input paths 112. In one embodiment, the storage element buffers may be implemented as a FIFO. Storage elements of the input interface buffer blocks provide corresponding outputs to the switching block 106 via output paths 114. Data sources 112 providing data on paths 112 may be analog to digital converters (ADC). The provision of input blocks 104 enables connection of ADCs of widely varying sampling rates with variable ADC output voltages. Further, the technique enables an ADC to provide data to the switching block 106 even if the sampling rate of the ADC (rate at which ADC provides digital outputs) is higher than the operational speed of the switching block 106.

Analogously, temporary storage elements within output interfaces in the output blocks 108 enable the cores to operate at different clock speeds. Each output interface of the output blocks 108 may be implemented as a circular buffer in an example embodiment. Depth of the circular buffers of the output buffer block may be selected according to desired operating frequencies of the cores. A discussion of a circular buffer embodiment is provided and discussed below in reference to FIG. 4. In general, the switching block 106 operates to allow different ADC channels (data sources 102) to be connected to different (and desired) circular buffers in the output blocks 108, and thus the processor cores in the processor blocks 110, or memory locations (data destination blocks, in general). Switching block 106 receives data on paths 114 from the input blocks 104, and is operable to selectively provide the outputs on desired/required path in output paths 116. To illustrate, data received from a first storage element in the input blocks 102 may be routed/provided on a desired path in output paths 116 to any one of storage elements within the output blocks 108, and therefore to the desired processing core within the processor blocks 110. Similarly, switching block 106 is operable to forward data on any path in the data paths 114 to any path in the data paths 116. The operation of switching block 106 in routing data received on paths in data paths 114 and 116 may be designed in a round-robin fashion or weighted fair. In an embodiment the switching block 106 may be implemented using a fixed point space switch or a floating point space switch. The space switch may be a crossbar N stage shuffle exchange on a Banyan, as shown in FIG. 5b. In yet another embodiment, a second space switch is implemented in case the first space switch fails. An example of this implementation is shown in FIG. 5c, where the input blocks 104 and the output blocks 108 are interfaced with two fully connected space switches 106a and 106b. In one embodiment, the space switch 106a is on while the space switch 106b is off during normal operation. Then, if the space switch 106a fails, the space switch 106b will be turned on to replace the failed space switch 106a.

In an embodiment, the data interface circuit 100 includes a multi-channel interrupt controller (not shown) which generates an interrupt to the corresponding one of cores in the processor blocks 110, when a corresponding circular buffer in output buffer block has new data available. Some embodiments of the data interface circuit 100 may be implemented without the output blocks 108. In such embodiments, the outputs of switching block 106 may be provided directly to the respective cores of the processor blocks 110.

Figure 2:
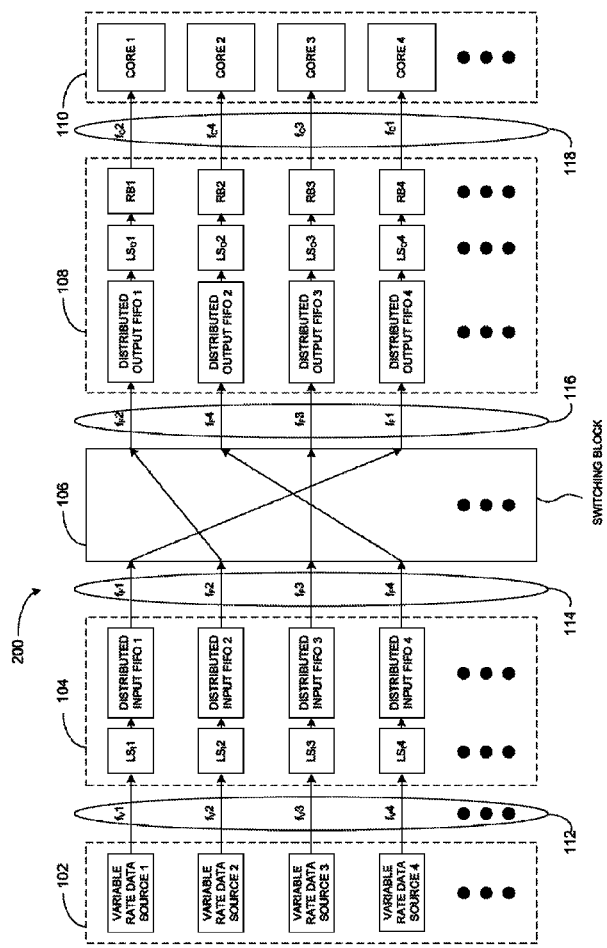
FIG. 2 shows an alternative example embodiment of a data interface circuit having level shifters and distributed FIFO buffers.

FIG. 2 shows an alternative example embodiment of a data interface circuit 200. As shown, the input interface blocks 104 of the data interface circuit 200 includes a plurality of input level shifters $LS_I1, LS_I2, \ldots LS_In$ coupled to a plurality of distributed input first-in first-out buffers DISTRIBUTED INPUT FIFO 1, DISTRIBUTED INPUT FIFO 2, ... DISTRIBUTED INPUT FIFO n. Similarly, the output interface blocks 108 of the data interface circuit 200 includes a plurality of output level shifters $LS_O1, LS_O2, \ldots LS_On$, coupled to a plurality of distributed output first-in first-out (FIFO) buffers DISTRIBUTED OUTPUT FIFO 1, DISTRIBUTED OUTPUT FIFO 2, ... DISTRIBUTED OUTPUT FIFO n, further coupled to plurality of reorder buffers RB1, RB1, ... RBn. The following discussions discuss the functions of the level shifters and buffers as shown in the data interface circuit embodiment 200 of FIG. 2.

The data interface circuits 100 and 200 may accommodate a wide variety of data sources (e.g., ADC output voltages). The data sources 102 typically provide data at variable rates, such as ADCs operating at different sampling rates to receive analog inputs from the external world and convert the analog inputs into digital data samples suitable for processing by the microprocessor. The digital data samples are outputted at a sampling rate that is specific to each data source. Different data sources may have widely different sample rates and may be bursty in nature. In addition, the different data sources will likely have different voltage levels as well.

The variable voltage and frequency samples from different sources are converted to a frequency and voltage suitable to the multi-core processor. As shown in FIG. 2, the data interface circuit 200 contains level shifters or voltage-level translator. The level shifters $LS_O1, LS_O2, \ldots LS_On$, are coupled to the output of each of the data sources 102.

The data sources are typically providing data a different variable voltages and data rates. In an example operation, the ADC outputs digital data samples at a voltage of 3.3 volts and frequency of 10 MHz. The level shifters convert the voltage of the digital data samples to between 0V-1V to match to the voltage of the space switching block. The switching block 106 operates at a voltage that is optimized for minimum power consumption. The digital data samples having voltage between 0V to 1V are queued up in the corresponding distributed input FIFO. The conversion of the voltage from the ADC output voltage to a level suitable for the distributed input FIFO 300a is accomplished by a voltage level shifter placed in a location in proximity to the distributed FIFO. The voltage level shifter (LS) can occupy a variety of positions in the input line. In one embodiment FIG. 2 the LS is shown to be placed before the distributed FIFO. If the ADC output voltage is low the distributed FIFO can be placed between the variable data source 102 and the level shifter. In this case the level shifter is placed in proximity with the space switch 106.

Figure 3A:
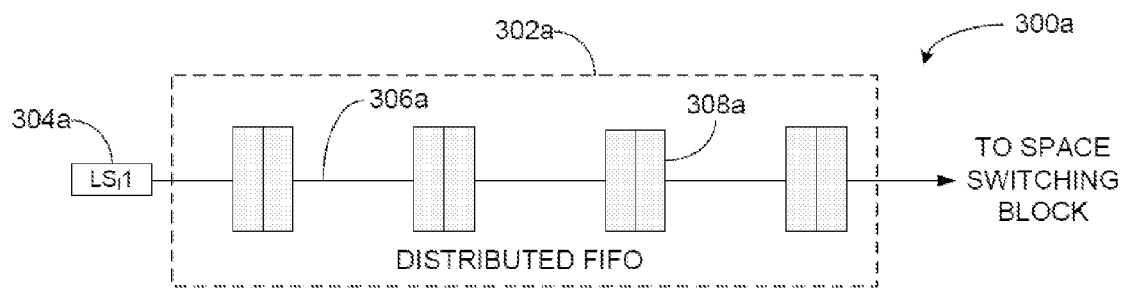
FIG. 3a is an illustrative block diagram of a distributed FIFO buffer.
Figure 3B:
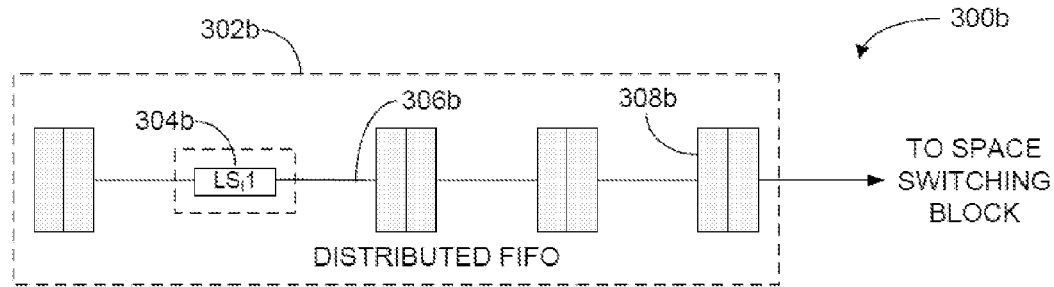
FIG. 3b is an illustrative block diagram of a distributed FIFO buffer, wherein the level shifter is among distributed FIFO buffer segments.

In an embodiment, FIFO buffers are used to convert digital data sample rates. These FIFO buffers may be distributed FIFO buffers, which have energy saving advantages of traditional local FIFO buffers. FIG. 3a is an illustrative block diagram of a distributed FIFO buffer 302a, receiving input from a level shifter 304a and providing an output to a space switching block. In an embodiment, the space switching block can be the switching block 106 as shown in data interface circuits 100 and 200 of FIGS. 1 and 2, respectively. The distributed FIFO buffer 302a has storage elements distributed along the interconnect 306a. In an example embodiment, the storage elements may be registers. FIG. 3b is an illustrative block diagram showing a distributed FIFO buffer 302ba case where a level shifter 304b is among parts of the distributed FIFO buffers 308b. In this embodiment, the FIFO buffers between the level shifter 304b and the ADC output may operate at the same voltage level as the ADC output voltage and the FIFO buffers between the level shifter 304b and the space switching block may operate at the same voltage level as the switching block voltage.

Figure 3C:
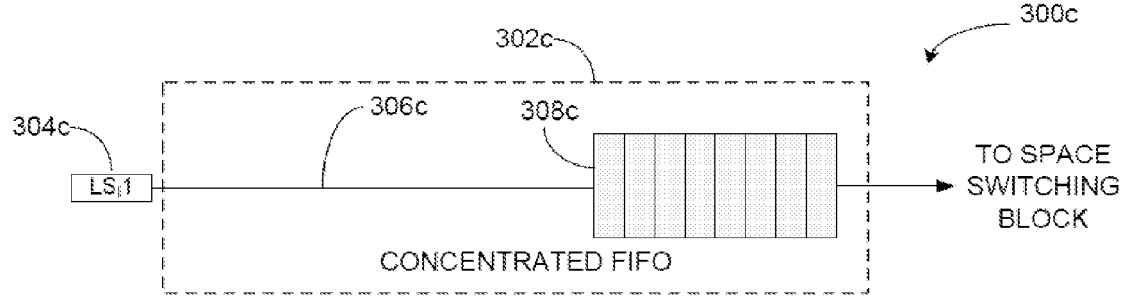
FIG. 3c is an illustrative block diagram of a traditional local FIFO buffer.

In comparison, FIG. 3c is an illustrative block diagram of a traditional concentrated FIFO buffer 302c, receiving input from a level shifter 304b and providing an output to a space switching block. The concentrated FIFO buffer 302c has storage elements 308c concentrated together and coupled to the interconnect 306c.

The energy savings of a distributed FIFO buffer over a concentrated FIFO buffer is related to the difference in supply voltage and line capacitance distribution. Energy required to transmit N words over a single interconnect for a concentrated FIFO buffer can be represented by $$E_C = E_1 \cdot M \cdot N \quad (1),$$

where M is the number of data samples to be transmitted, and $E_1$ is the energy required to transmit one sample over the interconnect, represented as $$E_1 = \frac{1}{4} C_{line} \cdot N \cdot V_{dd1}^2. \quad (2)$$

$C_{line}$ is the capacitance of the interconnect, and $V_{dd1}$ is the supply voltage level.

On the other hand, the energy required to transmit N words over a single interconnect for a distributed FIFO buffer can be represented as $$E_D = \frac{C_L}{4(N-1)} V_{dd2}^2 \cdot M. \quad (3)$$

As such, the ratio of energy required for a distributed FIFO buffer to the energy required for a concentrated FIFO buffer can be represented as $$\frac{\frac{C_L}{4(N-1)} V_{dd2}^2 \cdot M}{\frac{1}{4} C_L V_{dd1}^2 \cdot M} = \frac{1}{(N-1)} \left( \frac{V_{dd2}^2}{V_{dd1}^2} \right). \quad (4)$$

Because the interconnect segment lengths between the distributed storage elements is shorter than the interconnect length of a concentrated FIFO buffer, $V_{dd2}$ is smaller than $V_{dd1}$. This factor, along with the distribution of the line capacitance results in the lower power consumption of distributed FIFO buffers when compared against the traditional concentrated FIFO buffers.

For the following discussion, an embodiment wherein the distributed FIFO of FIG. 3a is implemented within the data interface circuit 100 of FIG. 1 is generally referred to. The power efficiency of the distributed FIFO lies in its ability to transmit words of data over short multiple hops from the data source 302a to the switch block 106. The words of data are transmitted between multiple small FIFO buffers 308a. The capacitance between each smaller distributed FIFO buffer element is a fraction of the capacitance. Between the data source 102 and the switch block 106. the data source 102 is able to transmit data to the level shifter 304a and from the level shifter 304a, multiple pathways emerge. The output from the level shifter 304a can be written at multiple addresses within the distributed FIFO buffers 308a.

Figure 3D:
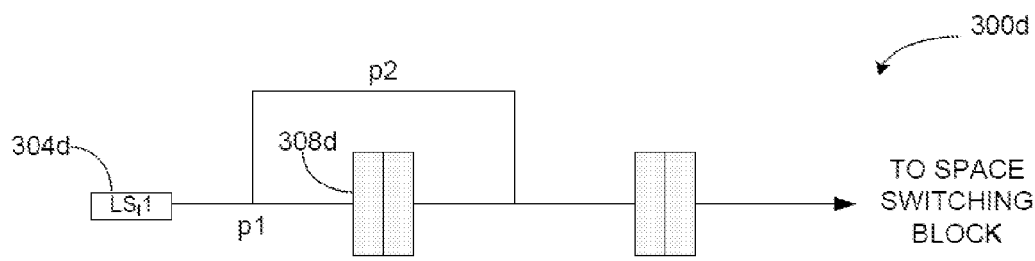
FIG. 3d is an illustrative block diagram showing different data paths of a distributed FIFO buffer embodiment.
Figure 3E:
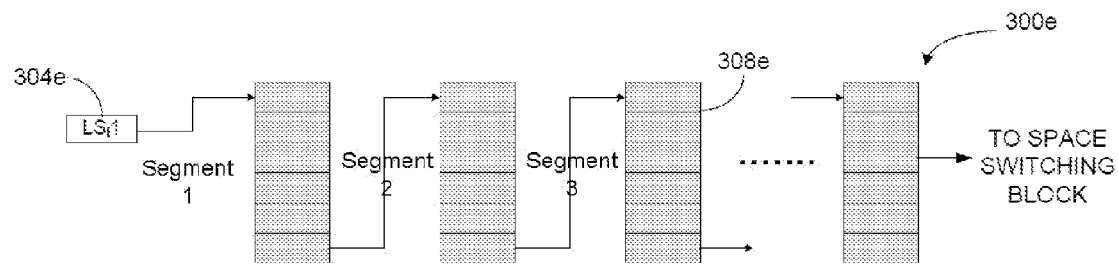
FIG. 3e is an illustrative diagram showing how multiple sections of a distributed FIFO buffer can be connected together to form a complete distributed FIFO buffer.

FIG. 3d is an illustrative block diagram showing different data paths of a distributed FIFO buffer embodiment. Specifically, FIG. 3d, shows two data paths leading to different locations in the distributed FIFO buffers. In an embodiment when two words are written the topmost word from W1 is transmitted to W2. This involves charging a first segment capacitance when writing to a first section of the distributed FIFO buffers, and charging both the first segment capacitance and a second segment capacitance when writing to the second section of the distributed FIFO buffers FIG. 3e is an illustrative diagram showing how multiple sections of a distributed FIFO buffer can be connected together to form a completed distributed FIFO buffer. As shown, the different sections of the distributed FIFO buffers each have a plurality of locations, and allows for multiple data paths.

For M numbers of parallel paths through which the data source 102 can write to the distributed FIFO buffers, the transmit energy can be represented as:

$$E = p_1 \frac{1}{4} C_s V_{DD1}^2 + p_2 \frac{1}{4} (2C_s) V_{DD1}^2 + \quad (5)$$
$$p_3 \frac{1}{4} (3C_s) V_{DD1}^2 \ldots + p_m \frac{1}{4} (mC_s) V_{DD1}^2,$$

where $p_i$ represents the probability that a data transfer occurs over a particular data path i, $C_s$ represents the capacitance at the respective segment and $V_{DD}$ represents the supply voltage from the data source 102. As mentioned above, an embodiment of the distributed FIFO buffers 308d may have power reduction benefits over conventional FIFO buffers.

Figure 3F:
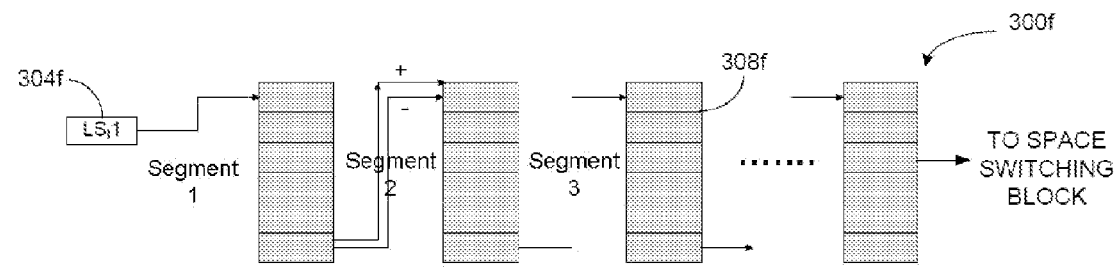
FIG. 3f is an illustrative block diagram showing the segments of a distributed FIFO buffer connected using differential signaling, which results in lower power consumption and higher data rates.

The power reduction is a result of multiple factors like lowered capacitance and supply voltage. First, because the level shifter 304d is placed before the distributed FIFO buffers 308d, the voltage at which the input data words are written may be lower than the output voltage of the data source 102. Second, because the data words travels in hops between segments of the distributed FIFO buffers 308d, the overall line capacitance is lowered by a factor of C/N, where N represents the number of separate buffer elements in the distributed FIFO buffers 308d. The lower capacitance leads to lowered energy by a factor of N required to transmit data over a single hop. Third, the low differential voltage data transfer elements between each segment of the distributed FIFO buffers 308d may be single ended, thereby further reducing power consumption. FIG. 3f is an illustrative block diagram showing the segments of a distributed FIFO buffer connected using differential signaling, which results in lower power consumption and higher data rates. In this embodiment, the interface between the segments may be further be in a parallel differential configuration, thereby increasing the data rate over a serial differential interface.

In a realistic scenario, the probability of writing to a first section of the distributed FIFO buffers may be higher than the probability of writing to a second section of the distributed FIFO buffers and so on. In an example embodiment, $p_1=0.8$, $p_2=0.1$, $p_3=0.04$ and $p_4=0.01$. In this case if the segments 2, 3 and 4 were to be written to, the additional capacitance required for charging the segments will be required and the additional energy expenditure will appear in the form of spikes in the current signal.

To further discuss the reduced energy expenditure of a distributed FIFO buffer, a mathematical derivation is provided comparing the energy expenditure of a conventional FIFO buffer and the energy expenditure of a distributed FIFO buffer, as implemented in a multi-hop network providing an output to a space switch. The energy expenditure of a conventional FIFO buffer can be provided as:

$$E_{conv} = N * \frac{C_L V_{DD}^2}{4} = N \frac{C_s N * V_{DD}^2}{4} = N^2 \frac{C_s V_{DD}^2}{4} \quad (6)$$

where N represents the number of words to be written, $C_L$ represents the overall line capacitance (including N segments), $C_s$ represents the capacitance of an individual segment, and $V_{DD}$ represents the signal voltage level.

To compute the energy expenditure of a distributed FIFO buffer according to an embodiment of the present application, the energy required to write a single word is assumed to comprise of two components. The first component is the energy required to write into the distributed FIFO buffer and the second component is the energy required to transmit a data word to the far end of the distributed FIFO buffer. Accordingly, the energy expenditure of a distributed FIFO buffer can be provided as:

$$E_{red} = p_1 C_1 + \frac{C_L V_{DD2}^2}{4}(N-1) + p_1 2 C_1 + \frac{C_L V_{DD2}^2}{4}(N-2) + \quad (7)$$
$$p_1 k C_1 + \frac{C_L V_{DD2}^2}{4}(N - (N-1))$$
$$= \sum_{k=1}^{k=N-1} p_j k C_j + \sum_{k=1}^{N-1} C_L V_{DD2}^2 (N-k)$$

where N represents the number of words to be written, $C_L$ represents the line capacitance, $V_{DD2}$ represents the signal voltage level, and k represents the kth variable rate data source feeding into the distributed FIFO. For a uniform transmission probability distribution, wherein each segment is equally likely to transmit a word, the probability for each segment to transmit a word from a total of N words is $$p = \frac{1}{N-1}.$$

As such, the energy expenditure ratio between a distributed FIFO buffer of the present application and a conventional FIFO buffer can be provided as:

$$\frac{E_{red}}{E_{conv}} = \quad (8)$$

$$\frac{\text{Energy required to transmit } N \text{ words in distributed } FIFO}{\text{Energy required to transmit } N \text{ words in conventional } FIFO} =$$

$$\frac{\sum_{k=1}^{k=N-1} p_j k E_j + \sum_{k=1}^{N-1} \frac{C_L V_{DD2}^2}{4}(N-k)}{N * (N * C_L) * \frac{V_{DD}^2}{4}} =$$

$$\frac{\text{Energy required to transmit } N \text{ words given uniform } PD}{\text{Energy required to transmit}} =$$
$$N \text{ words given convential } FIFO$$

-continued $$\frac{\sum_{k=1}^{N-1} \frac{C_L (1-\kappa)^2 V_{DD}^2}{4}(N-k) + \sum_{k=1}^{k=N-1} p_j k E_j}{N^2 C_L * \frac{V_{DD}^2}{4}}$$

where k is the number of variable data rate sources, and the factor $(N-k)*C_L$ is the capacitance of the included segments. Due to the lower capacitance required for charging or discharging when writing to a buffer, $V_{DD2}$ can be defined as $(1-\kappa)\cdot V_{DD}$. The variable $\kappa$ is a factor taking into account the lowering of the supply voltage when a distributed FIFO is added vis-à-vis an ordinary FIFO.

In the case that the capacitive terms dominate in the numerator of the energy expenditure ratio, the energy required to write to the distributed FIFO is lower than the energy required to transport the data by a factor of B, where $B \geq 0.5$. As such, equation 8 can be further simplified as:

$$\frac{\sum_{k=1}^{N-1} \frac{C_L(1-\kappa)^2 V_{DD}^2}{4}(N-k)}{N^2 C_L * \frac{V_{DD}^2}{4}} + \frac{\sum_{k=1}^{k=N-1} p_j k E_j}{N^2 C_L * \frac{V_{DD}^2}{4}} = \quad (9)$$

$$\frac{\sum_{k=1}^{N-1} \frac{(1-\kappa)^2 V_{DD}^2}{1}(N-k)}{N^2 * \frac{V_{DD}^2}{1}} + \frac{\sum_{k=1}^{k=N-1} p_j k E_j}{N^2 C_L * \frac{V_{DD}^2}{4}}.$$

Then, canceling out $V_{DD}^2$ from the numerator and denominator of the first term, we have $$=$$

$$\frac{\sum_{k=1}^{N-1}(1-\kappa)^2(N-k)}{N^2} + B * \frac{\sum_{k=1}^{N-1} \frac{(1-\kappa)^2 V_{DD}^2}{1}(N-k)}{N^2 * \frac{V_{DD}^2}{1}} = \quad (10)$$

$$\frac{\sum_{k=1}^{N-1}(1-\kappa)^2(N-k)}{N^2} + B * \frac{\sum_{k=1}^{N-1}(1-\kappa)^2(N-k)}{N^2}.$$

$$= (1-\kappa)^2(1+B)\sum_{k=1}^{N-1} \frac{(N-k)}{N^2} =$$

$$(1-\kappa)^2(1+B)\frac{(N-1) \cdot N}{2N^2} \approx (1-\kappa)^2 * 1.5 * \frac{(N-1)}{2N}$$

In the case of a large N number of distributed FIFO segments, $\kappa \approx 0.9$, and accordingly, the energy expenditure ratio is approximately 0.81×0.5×1.5=0.6. In other words, a 40% reduction in energy expenditure can be achieved using distributed FIFO buffers with a large number of segments. In summary, for a uniform transmission probability distribution, a distributed FIFO buffer with line segments between the buffers requires less power to transmit data than a conventional FIFO buffer with a single longer transmission line.

In an embodiment, the distributed input FIFO buffers convert the digital data samples of variable frequency (e.g., 8 MHz) into the digital samples of fixed frequency. The fixed frequency may be a frequency of 25 MHz. The fixed frequency may be a frequency that is compatible with the space switching block. The space switching block directs the $i^{th}$ ADC channel to the $j^{th}$ core. The space switching block can support multiple independent channels. For example, the space switching block can receive inputs from 8 ADCs and forwards the 8 inputs simultaneously to the respective core. To further reduce energy expenditure, the data transmitted between on the line segments between the buffers can be based on Gray coding or bit-reversal encoding. Accordingly, the distributed FIFO segments may be connected to the level shifter using lower power Gray-coded encoders and decoders, in a further embodiment.

Figure 3G:
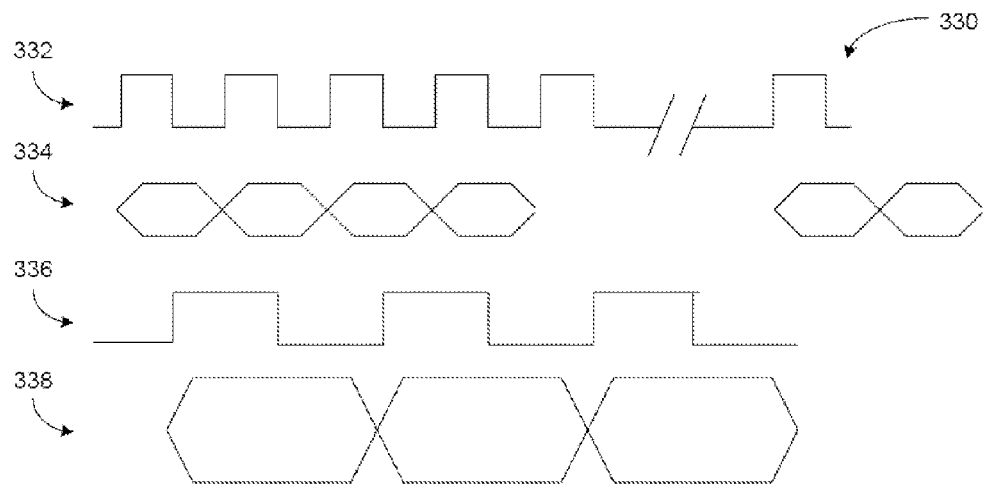
FIG. 3g shows a timing diagram for the components of the input blocks of a data interface circuit.

FIG. 3g shows a timing diagram 330 for the components of the input blocks 104 of FIGS. 1 and 2. The timing diagram 330 shows an ADC write-clock 332 which determines the rate at which data is written into distributed input FIFO buffers, a corresponding ADC output data 334 signal which indicates data written to the distributed input FIFO buffers, a corresponding distributed input FIFO read clock 336 which matches the switch clock of the switch 106, and a switch read clock 338 indicating the reading of data from the distributed input FIFO buffers by the switch 106.

As shown in FIGS. 1 and 2, each of the output (digital data samples of frequency of 25 MHz and voltage between 0-1V) of the space switching block is fed to a distributed output FIFO buffers. Since each core of the multi-core processor operates at different frequencies, the distributed output FIFO buffers converts the digital data samples of fixed frequency to a frequency compatible with the corresponding core of the multi-core processor.

Figure 3H:
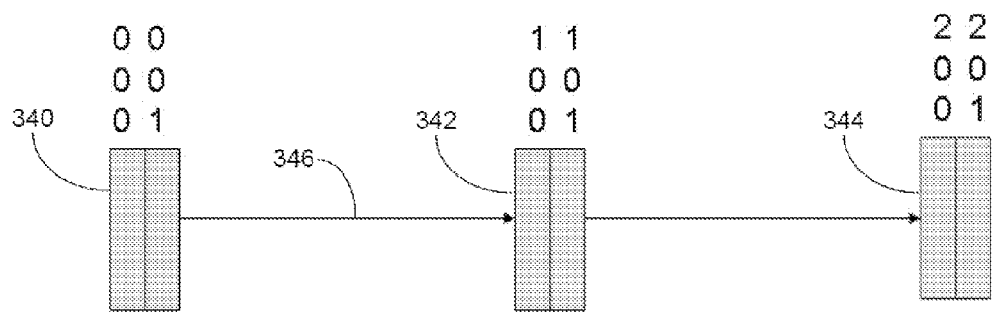
FIG. 3h is an illustrative block diagram of a distributed FIFO buffer segments, each having two storage elements.
Figure 3I:
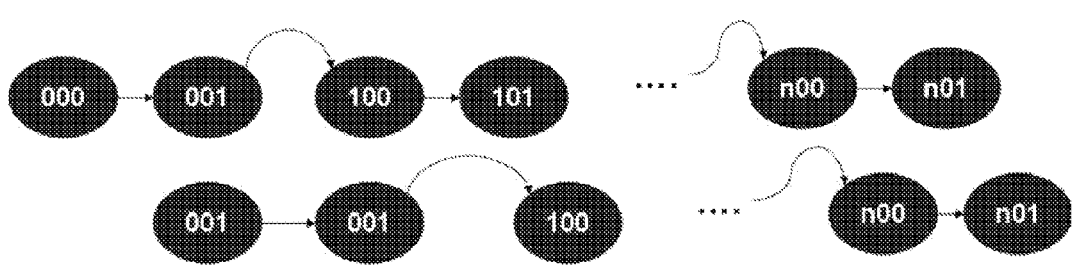
FIG. 3i is an illustrative flow diagram showing the progress of a datum as it proceeds through the distributed buffer segments.

FIG. 3h is an illustrative block diagram of a distributed FIFO buffer segments 340, 342 and 344, each having two storage elements and interconnected by an interconnect bus 346. In this embodiment each segment has three bit identifier, the first bit representing the segment number and the second and third bits representing the locations within the segment. FIG. 3i is an illustrative flow diagram showing the progress of a datum as it proceeds through the distributed buffer segments (for each of the two storage elements) to the switching block 106. As shown, once a buffer segment is full, the datum is transmitted to the next segment.

It can be noted that, each core runs at the different frequencies by itself and also the different cores run at different frequencies because each core is tuned to operate at a specific voltage and frequency by a dynamic voltage and frequency scaling (DVFS) controller. Further, the digital data samples outputted by the distributed output FIFO buffers are fed to a level shifter. The level shifter shifts the voltage (0-1V) associated with the digital data samples to a voltage compatible with corresponding core of the multi-core processor. The digital data samples having a suitable frequency and voltage are queued into reorder buffer.

Figure 4A:
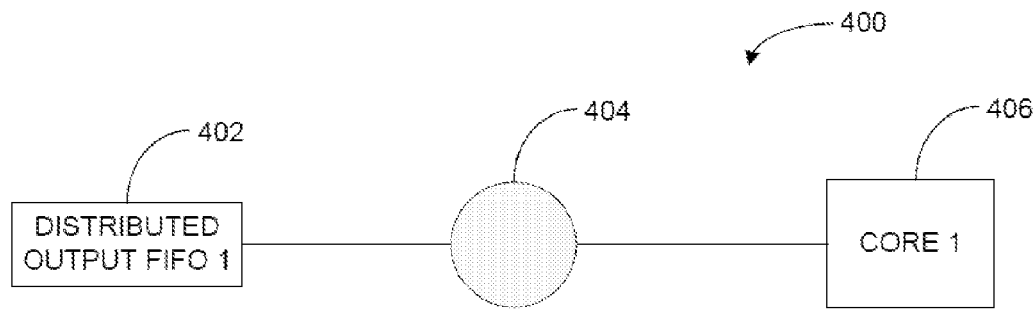
FIG. 4a is an illustrative block diagram of an output FIFO buffer coupled to a processor core by a reorder buffer.
Figures 4B, 4C:
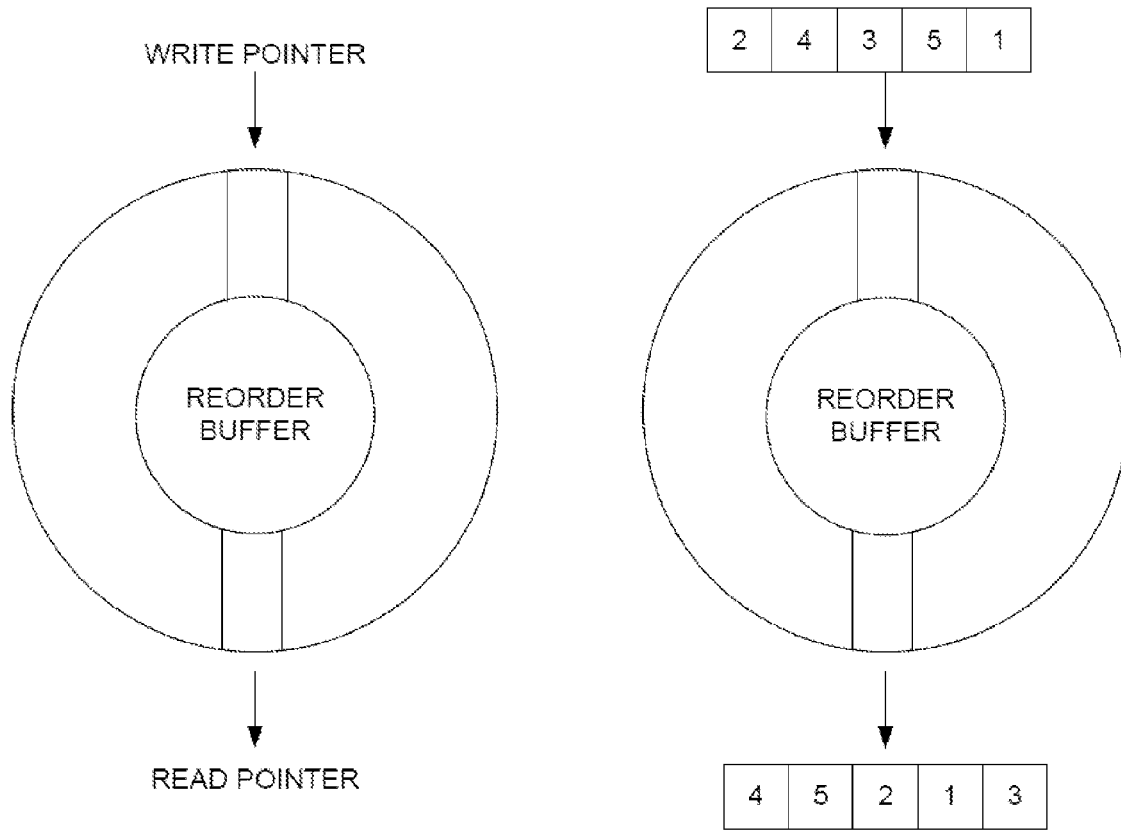
FIG. 4b is an example reorder buffer schematic having a write pointer input and a read pointer output.
FIG. 4c is an example of a reorder buffer schematic showing the reordering of the write pointer input for output.
Figure 4D:
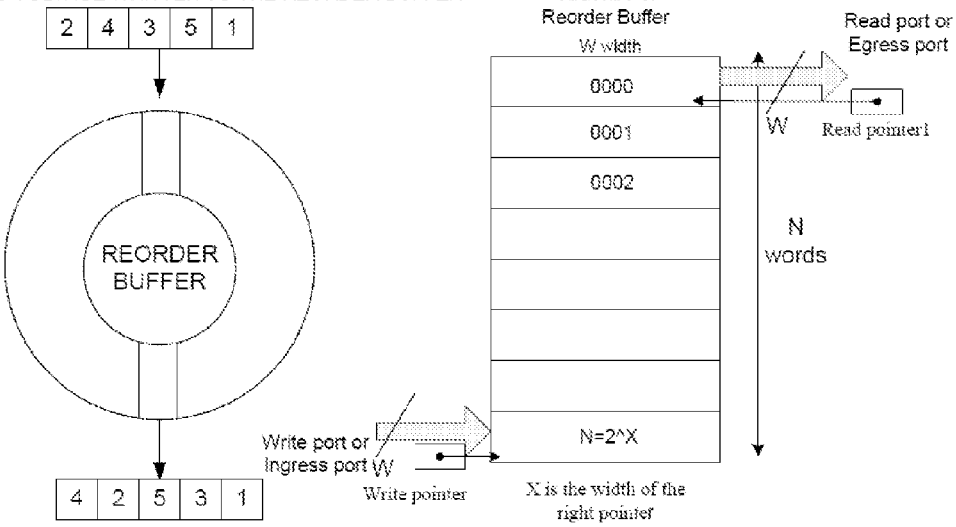
FIG. 4d is an illustrative example of the writing and reading of a reorder buffer having N ingress ports and N egress ports.
Figure 4E:
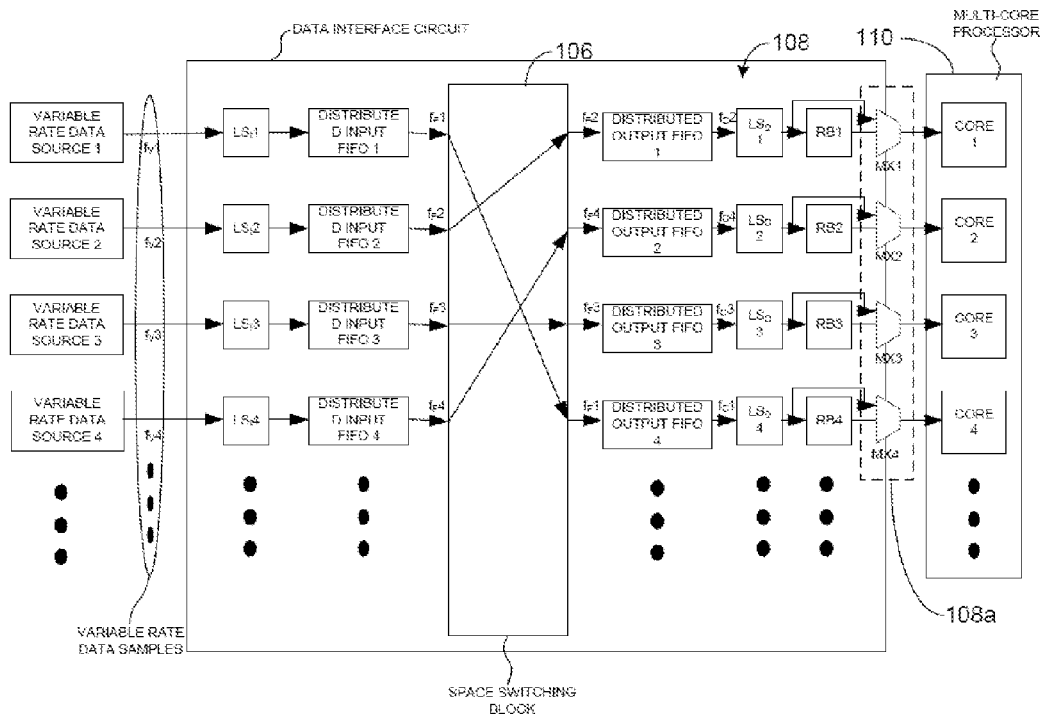
FIG. 4e shows an alternative example embodiment of a data interface circuit having level shifters and distributed FIFO buffers coupled to processor cores via reorder buffer bypassable using multiplexers.

FIG. 4a is an illustrative block diagram 400 of an output FIFO buffer 402 coupled to a processor core 406 by a reorder buffer 404. The reorder buffer is optional and the current data interface circuit may not require a reorder buffer instead the digital data samples from the level shifter are directly forwarded to the corresponding core of the multi-core processor. The importance of having a reorder buffer after the level shifter is that the reorder buffer allows queued digital data samples to be processed by the corresponding core in a sequence (departure or reading sequence) that is different from the writing or arrival sequence (the samples were written in). FIG. 4b shows an example reorder buffer schematic having a write pointer input and a read pointer output. FIG. 4c accordingly shows an example of a reorder buffer showing the reordering of the write pointer input for output. FIG. 4d is an illustrative example of the writing and reading of a reorder buffer having N ingress ports and N egress ports. In a further embodiment, the reorder buffers can be bypassed using multiplexers 108a, as shown in FIG. 4e.

However, if the sequence of the digital data samples is not important then the reorder buffer can be eliminated from the data interface circuit. In this manner, the data interface circuit processes the digital data samples from the ADCs and provides the processed digital data samples to the respective core of the multi-core processor for processing.

Figure 5A:
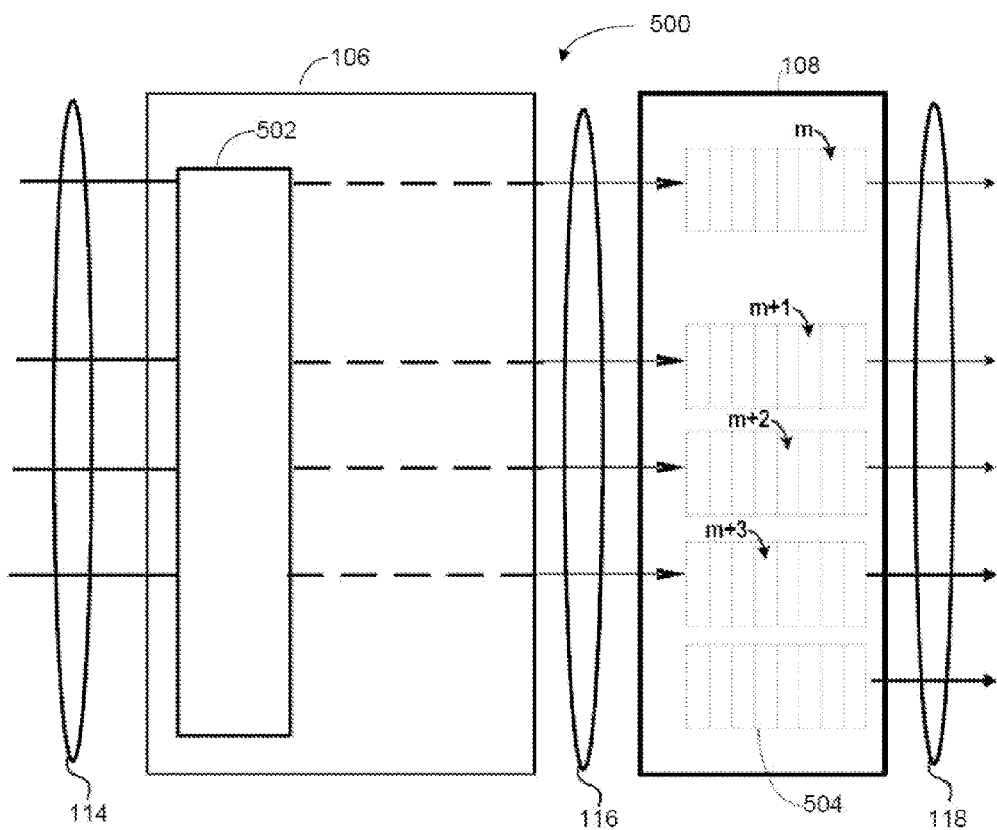
FIG. 5a is an illustrative block diagram of output buffer block having with error code correction and lower power consumption.
Figure 5B:
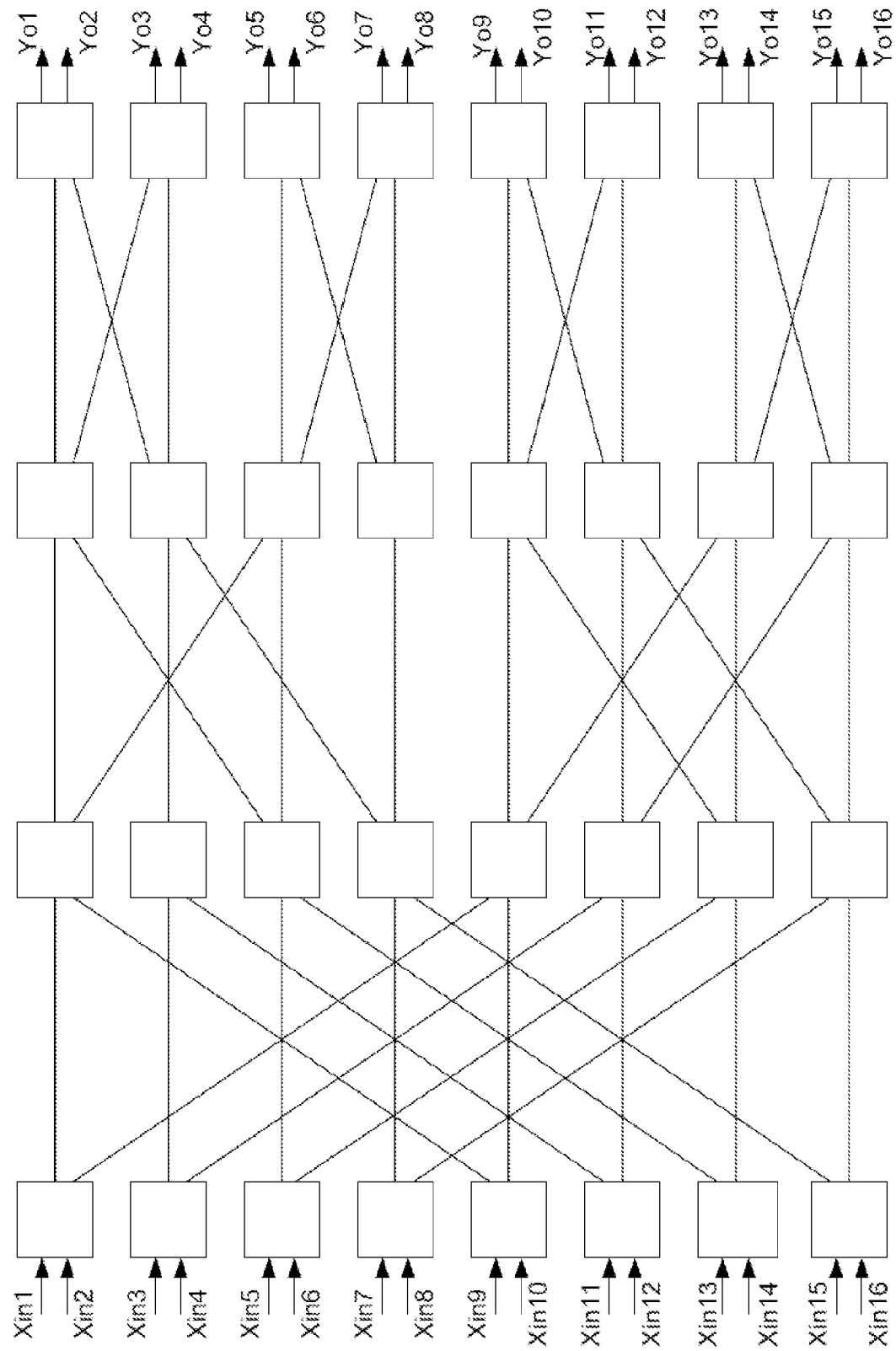
FIG. 5b The space switch may be a cross-bar N stage shuffle exchange on a Banyan, as shown in FIG. 5b FIG. 5c second space switch is implemented in case the first space switch fails
Figure 5C:
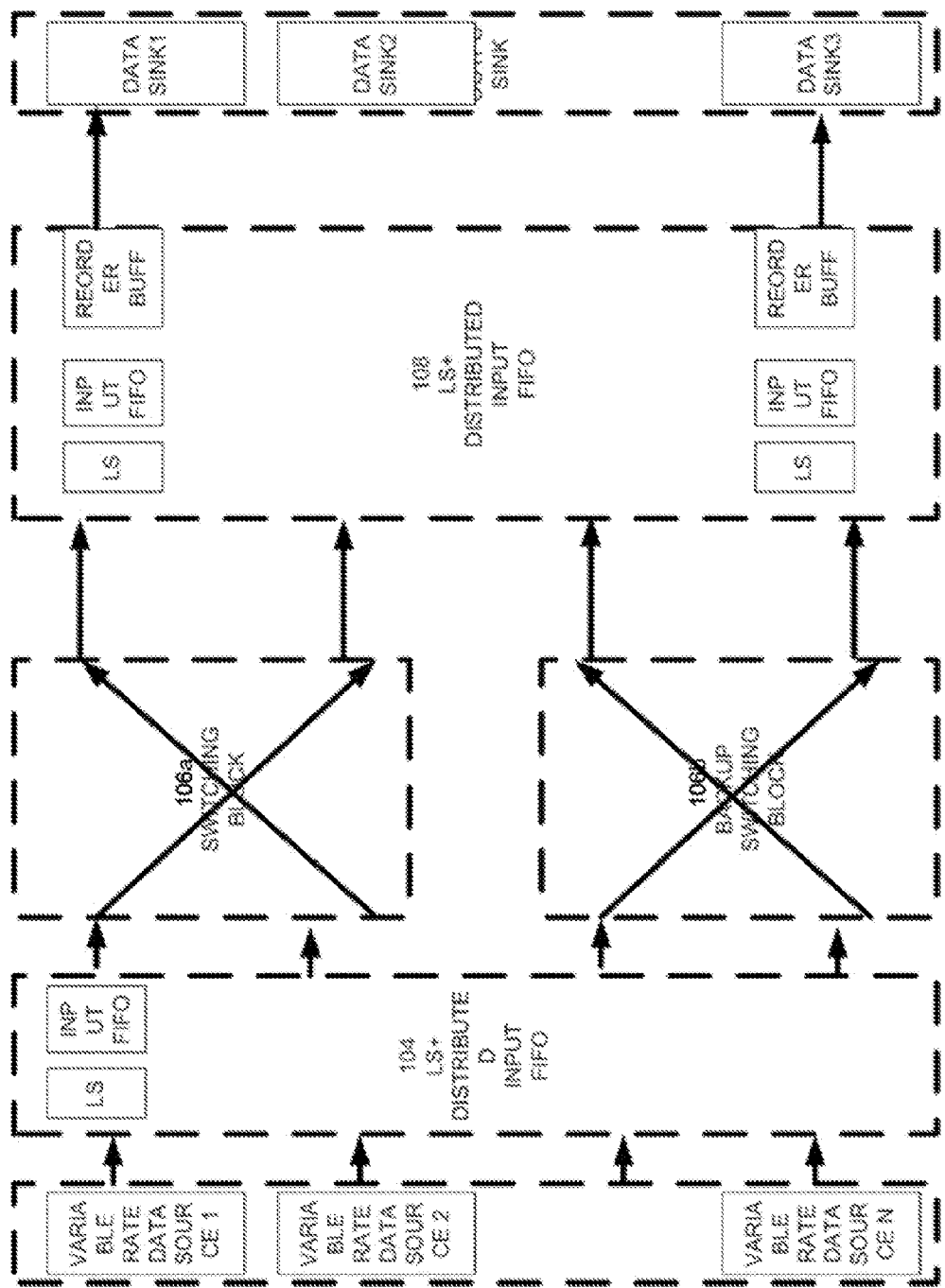

FIG. 5a is an illustrative block diagram of output buffer block having with error code correction (ECC) and lower power consumption. In an embodiment, switching block 106 encodes (performed by encoding block 502, shown in FIG. 5a) the data received as input (path 116) into a data string to minimize the number of bit transitions. This provides the benefits of lower power consumption in transferring data (due to reduced number of bit transitions). In one embodiment, encoding block 502 applies run length encoding. In another embodiment, encoding block 502 uses Gray code encoding.

To improve reliability of data transfer to the data destination devices, the data interface circuits 100 and 200 of FIGS. 1 and 2 respectively may be designed to employ the technique of data striping. As illustrated in FIG. 5a, logically sequential data obtained from a single data source (e.g., an ADC) are routed by the switching block 106 to multiple circular buffers (FIFOs) in the output buffer block, i.e., successive data words m, m+1, m+2, through to m+k, from the same data source are striped across the array of FIFOs in output buffer block.

In FIG. 5a, it is assumed that, the data is striped across four of the FIFOs in the output buffer block, with successive data words (or data units, in general) m, m+1, m+2, and m+3 from a same source being routed by the switching block 106 into four different FIFOs. The corresponding core (MP1 in the example) may reconstruct the final data words based on the information that the first data unit is written in the 2nd location of the first FIFO, 2nd data unit is written in location 3 of the second FIFO etc.

The ECC FIFO in output buffer block 108 stores an error correcting code (e.g., parity bits) received from encoding block 502, and corresponding to the four data units m through m+3, and enables forward error correction (FEC) at core MP1, even if errors were to occur in one or more of the four data units. More than one ECC FIFO can be implemented to accommodate data from multiple ADCs. In a similar fashion as noted above, encoding and data striping can be performed for data received from all data sources.

Figure 6:
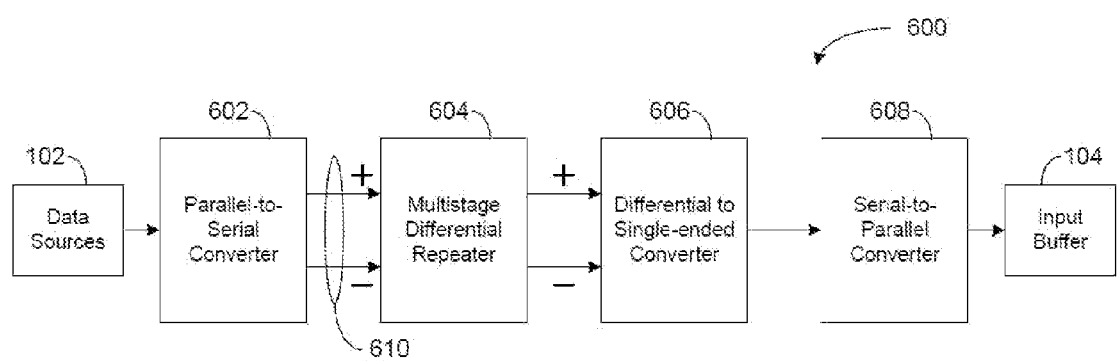
FIG. 6 is an illustrative block diagram of an input block having lower power consumption by converting parallel data inputs to serial data during transmission.

In one embodiment, the input blocks 104 of data interface circuit 100 of FIG. 1 contains a parallel to serial converter 602, serial to parallel converter 608, and differential repeaters 604 and 606, as shown in FIG. 6. Parallel to serial converter 602 accepts data in parallel format from a data source, and provides the data in serial differential form. The data in serial differential form may be transmitted via several stages of differential repeaters (denoted in FIG. 6 as multi-stage differential repeater 604), and converted to single-ended form by a differential to single-ended converter 606. Serial to parallel converter 608 converts the single-ended output of differential to single-ended converter 606, and provides the data in parallel format to input buffer block. In FIG. 6, connections corresponding to only one data path are shown, and can be replicated for as many data sources/data paths as supported by the data interface circuit 100. Power consumption is reduced due to the low voltage signaling used in transmitting the data in differential serial form. In one embodiment, energy savings is optimal with minimal complexity when the number of processors in the processor block 110 is between six and eight.

Figure 7B:
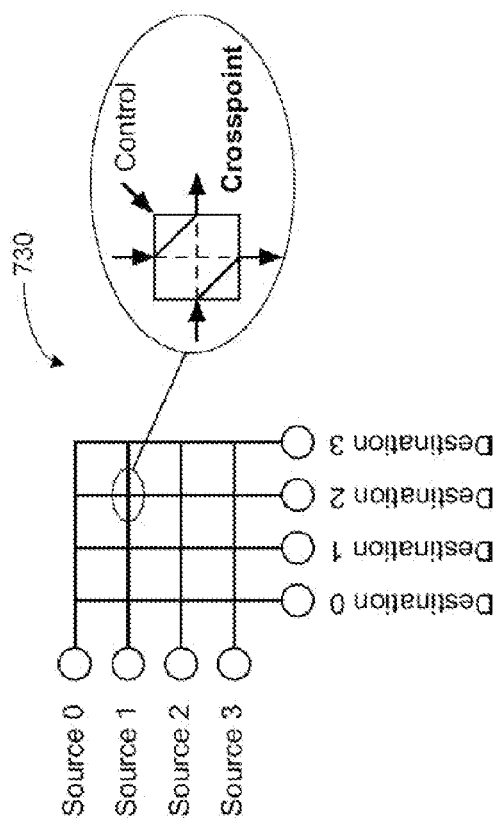
FIG. 7b is an illustration of a four by four cross bar, showing the ingress and egress ports.
Figure 7C:
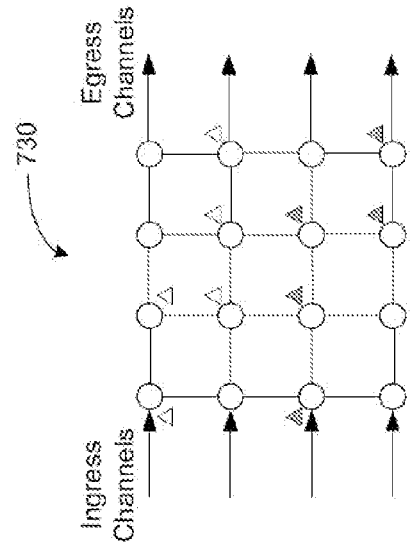
FIG. 7c is an illustration of the four by four cross bar having two concurrent data flows.
Figure 7A:
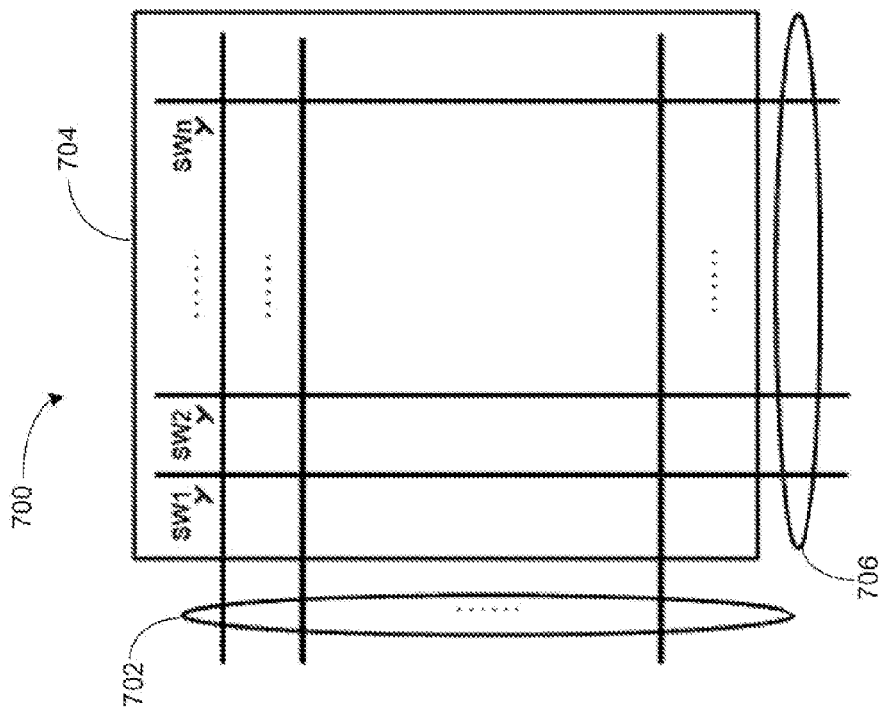
FIG. 7a is an example implementation of the switching block, using an N by N crossbar.

FIG. 7a is an example implementation 700 of the switching block 106, using an N by N crossbar 704. The N by N crossbar 704 receives input via a data paths 114 and provides an output via data paths 116. In this embodiment, the switching block 106 is implemented as a non-blocking switch, i.e., it has enough non-busy (free) paths through it at any time point during operation such that an input can always be provided at the output. Assuming that data paths 114 and 116 each contains N sub-paths (each as wide as the data width of the data source (ADC), any sub-path in input paths 114 can be connected to a desired sub-path in output data paths 116. Operation of switches SW1 through SWn in the example embodiment accomplishes connection of IN-sub-path 1 to any sub-path in data paths 116. FIG. 7b is an illustration of a four by four cross bar 730, showing the ingress and egress ports, and FIG. 7c is an illustration of the four by four cross bar 730 having two concurrent data flows. As shown, an embodiment of the cross bar allows any one of the N input ports to be connected to any one of the N output ports, and allows more than one connection can exist at the same time. The N by N crossbar 704 of FIG. 7a may be an extended implementation of the four by four crossbar 730.

Figure 8A:
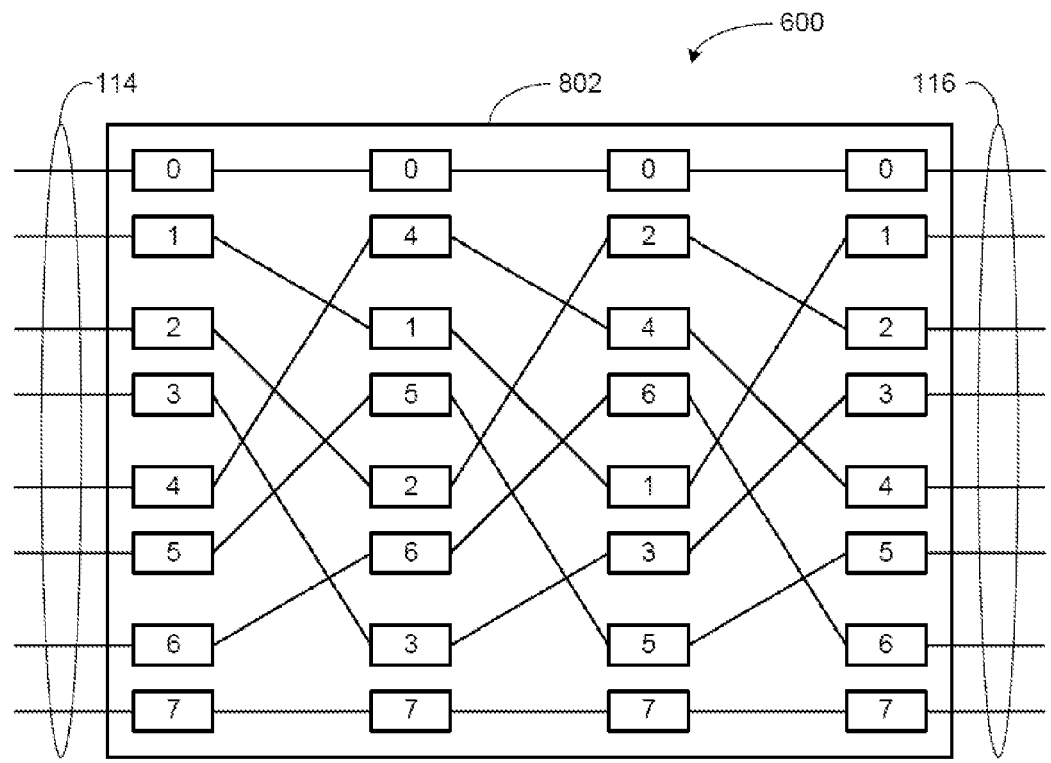
FIG. 8a is an illustration of an example implementation of the switching block with a shuffle-exchange (S/E) network.
Figure 8B:
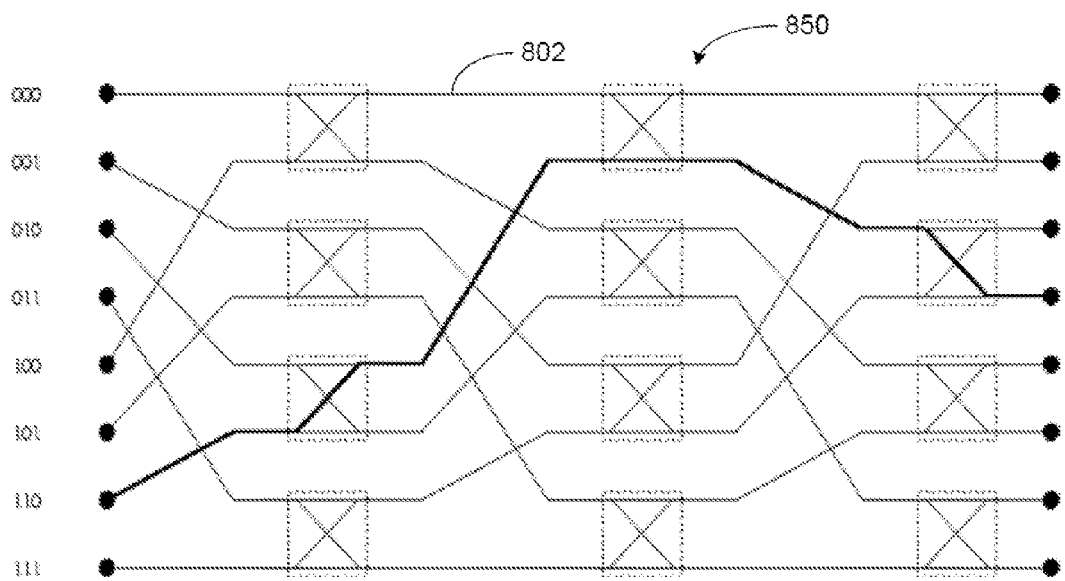
FIG. 8b is an example data path of the S/E network implementation of the switching block.

Another example implementation of the switching block 106 is the use of a shuffle-exchange (S/E) network 800 as shown in FIG. 8a. In an embodiment, the S/E network 800 can be implemented using cross bars. As implemented, the S/E network allows any one input node to be coupled to any output node, and allows a large number of concurrent connections to be executed. Each cross bar allows multiple streams to be routed within the shuffle exchange network. FIG. 8b is an example data path of the S/E network implementation of the switching block.

Switching block 106 implemented as an S/E network offers the benefits of lower power consumption when compared to implementation as a crossbar, and the technique is also more scalable to accommodate more processor cores and more input data sources. In yet another embodiment, the switching block 106 may be implemented as a Benes network. To further improve the functionality of the data interface circuit 100 of FIG. 1, a dither addition stage may be added at the input block 104 or output block 108.

Figure 9:
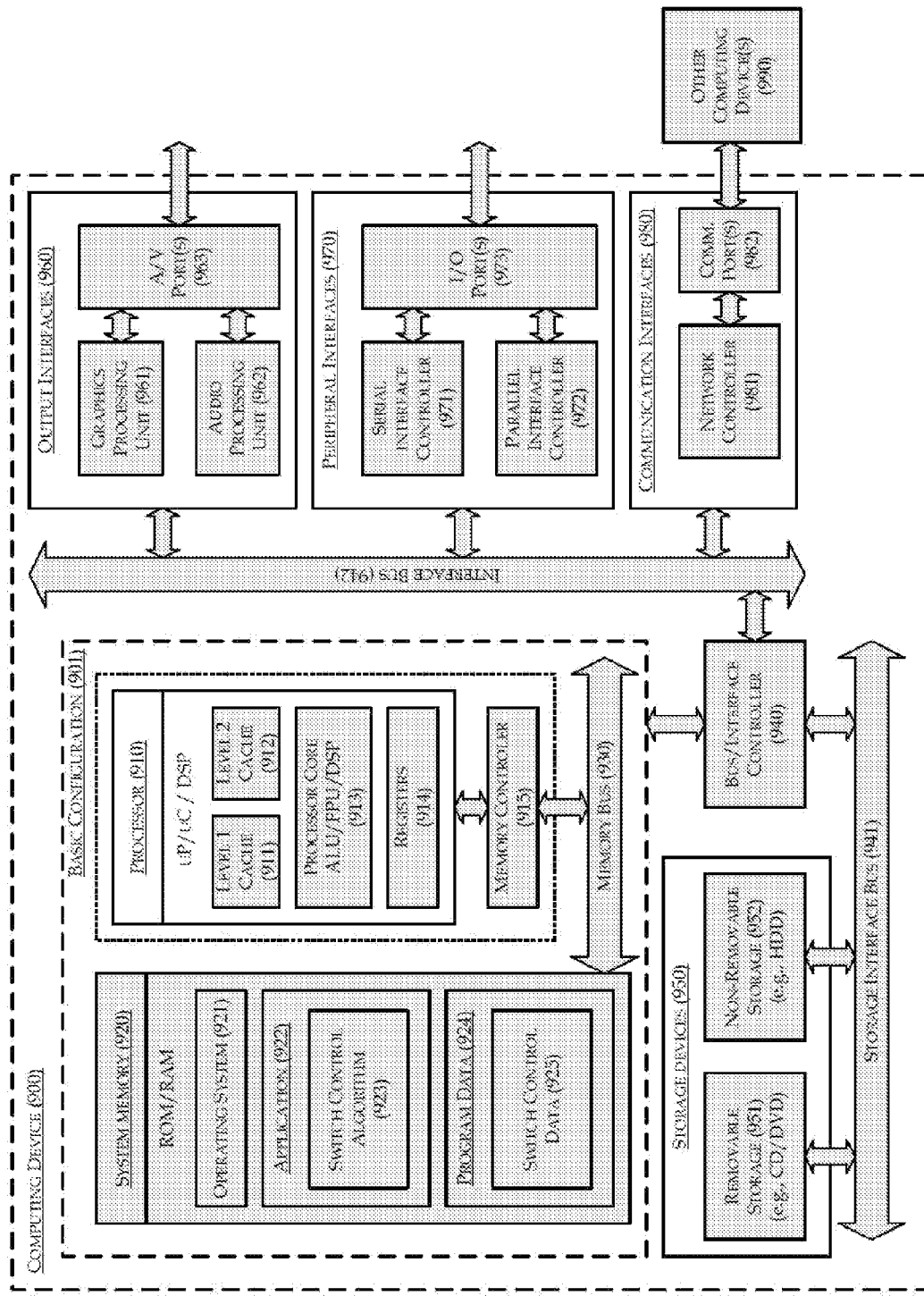
FIG. 9 is a block diagram illustrating an example computing device that is arranged for data interface multipath routing in accordance with the present disclosure.

FIG. 9 is a block diagram illustrating an example computing device 900 that is arranged for data interface multipath routing in accordance with the present disclosure. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (µP), a microcontroller (µC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a data interface multipath processing algorithm 923 that is arranged to . . . Program Data 924 includes data interface multipath routing data 925 that is useful for to accommodating data collection from a large number of sources having varying voltage ranges and frequencies, as will be further described below. In some example embodiments, application 922 can be arranged to operate with program data 924 on an operating system 921 such that large number of sources having varying voltage ranges and frequencies can be accommodated. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 960 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

References throughout this specification to "one embodiment", "an embodiment", or similar language means that a particular feature, structure, or characteristic described in connection with the embodiment is included in at least one embodiment. Thus, appearances of the phrases "in one embodiment", "in an embodiment" and similar language throughout this specification may, but do not necessarily, all refer to the same embodiment.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An integrated circuit comprising:
    a switching block configured to route received data to an output, the output selected from a plurality of outputs;
    an input data interface configured to be coupled to the switching block and further configured to:
        receive input data,
        convert the input data into a form compatible for the switching block,
        convert a voltage level of the input data to a voltage level compatible for the switching block, and
        provide the converted data to the switching block; and
    an output data interface configured to be coupled to the switching block and configured to:
        receive routed data from the switching block,
        convert the routed data into a form compatible for the selected output,
        convert a voltage level of the routed data to a voltage level compatible for the selected output, and
        provide output data to the selected output.

2. The integrated circuit of claim 1, wherein the input data interface is further configured to convert a frequency of the input data to a frequency compatible for the switching block, and wherein the output data interface is further configured to convert a frequency of the routed data to a frequency compatible for the selected output.

3. The integrated circuit of claim 2, wherein the input data interface comprises:
    a first-in first-out (FIFO) buffer configured to convert the frequency of the input data to the frequency compatible for the switching block, and
    a voltage level shifter configured to convert the voltage level of the input data to the voltage level compatible for the switching block.

4. The integrated circuit according to claim 3, wherein the FIFO buffer is further configured to convert the frequency of the input data to the frequency compatible for the switching block by adjustment of a data rate of the input data to a data rate compatible for the switching block.

5. The integrated circuit of claim 3, wherein the FIFO buffer comprises a distributed FIFO buffer comprising one or more sub-blocks, the one or more sub-blocks occupying different physical locations on a silicon die comprising one or more memory locations.

6. The integrated circuit of claim 3, wherein the voltage level shifter is configured in a single ended mode and configured to convert unipolar or bipolar digital signals to voltage levels compatible with the FIFO buffer.

7. An integrated circuit comprising:
    a space switch configured to route received data to an output, the output selected from a plurality of outputs;
    a plurality of input interfaces configured to receive input data, each input interface comprising an input voltage level shifter and an input distributed first-in first-out (FIFO) element interconnected by segments of interconnects, wherein the input voltage level shifter is configured to convert a voltage level of the input data to a voltage level compatible for the space switch, and wherein the input distributed FIFO element is configured to convert a frequency of the input data to a frequency compatible for the space switch; and
    an output interface configured to receive routed data from the space switch and to provide output data to the selected output, the output interface comprising an output voltage shifter coupled in series to an output distributed FIFO element, wherein the output voltage shifter is configured to convert a voltage level of the routed data to a voltage level compatible for the selected output, and wherein the output distributed FIFO element is configured to convert a frequency of the routed data to a frequency compatible for the selected output.

8. The integrated circuit of claim 7, wherein the input distributed FIFO element and the output distributed FIFO element are implemented on an active layer of silicon of a two dimensional integrated circuit.

9. The integrated circuit of claim 7, wherein the input distributed FIFO element and the output distributed FIFO element are implemented on different layers of a three-dimensional silicon integrated circuit.

10. The integrated circuit of claim 7, further comprising a second space switch coupling the input interfaces to the output interface, the second space switch configured to route data to the output, wherein the second space switch is activated to replace the space switch if the space switch fails.

11. The integrated circuit of claim 7, wherein the space switch comprises a fixed point space switch.

12. The integrated circuit of claim 7, wherein the space switch comprises a floating point space switch.

13. The integrated circuit of claim 7, wherein the space switch comprises a multi-stage cross bar shuffle exchange.

14. The integrated circuit of claim 7, wherein the output interface further comprises a reorder buffer coupled in series to the output voltage shifter and the output distributed FIFO element, and wherein the reorder buffer is configured to reorder a first sequence of the routed data to be in a second sequence compatible for the selected output.

15. The integrated circuit of claim 14, wherein the reorder buffer comprises one input port having an address maintained by a write pointer and one or more output ports having addresses maintained by read pointers.

16. The integrated circuit of claim 14 wherein the reorder buffer further comprises multiple output ports coupled to different output voltage level shifters, the different output voltage shifters configured to provide the output data to different outputs of the plurality of outputs.

17. The integrated circuit of claim 7, wherein the output interface further comprises additional output distributed FIFO elements, wherein the output distributed FIFO element and the additional output distributed FIFO elements form an array of distributed FIFO elements, and wherein the routed data is striped across the array of distributed FIFO elements.

18. The integrated circuit of claim 7, wherein the input distributed FIFO element and the output distributed FIFO element each comprise a first segment and a second segment, wherein the first segment is physically located on one layer of a three-dimensional integrated circuit and the second segment is physically located on another layer of the three-dimensional integrated circuit, and wherein the first and second segments are coupled by vertical through-silicon via interconnects.

19. The integrated circuit of claim 18, wherein the first and second segments of the input and output distributed FIFO elements communicate differential signals.

20. The integrated circuit of claim 18, wherein the first and second segments of the input and output distributed FIFO elements communicate single ended signals.

21. A method comprising:
    receiving data samples in a first sequential order, the data samples having a voltage level and a frequency;

selecting an output from a plurality of outputs, wherein the selected output has requirements for a voltage level and a frequency different from the received data samples;

routing the data samples to the selected output;

converting the voltage level of the data samples to an output voltage level compatible for the selected output;

converting the frequency of the data samples to an output frequency compatible for the selected output; and reordering the data samples from a first sequential order to a second sequential order compatible for the selected output.

22. The method of claim 21, further comprising compressing the data samples based on run-length encoding, according to a requirement of the selected output.

23. The method of claim 21, further comprising encoding the data samples into one or more data strings, according to a requirement of the selected output.

24. The method of claim 21, further comprising encoding the data samples based on Gray code encoding, according to a requirement of the selected output.

25. The method of claim 21, wherein the converting the frequency of the data samples to an output frequency compatible for the selected output comprises adjusting a data rate of the data samples to a data rate compatible for the selected output.

* * * * *

UNITED STATES PATENT AND TRADEMARK OFFICE
CERTIFICATE OF CORRECTION

PATENT NO. : 8,451,147 B2
APPLICATION NO. : 13/320368
DATED : May 28, 2013
INVENTOR(S) : Mazumdar et al.

Page 1 of 2

It is certified that error appears in the above-identified patent and that said Letters Patent is hereby corrected as shown below:

Title Page 2, in item (56), under "OTHER PUBLICATIONS", in Column 2, Line 7, delete "al," and insert -- al., --, therefor.

In the Drawings

In Fig. 5C, Sheet 10 of 13, delete " 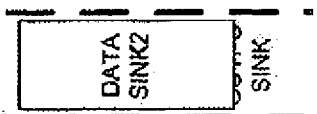 " and insert --  --, therefor.

In Fig. 9, Sheet 13 of 13, in Box "910", delete "uP/uC/DSP" and insert -- μP/μC/DSP --, therefor.

In Fig. 9, Sheet 13 of 13, in Box "915", delete "CONTROLER" and
insert -- CONTROLLER --, therefor.

In the Specification

In Column 3, Line 18, delete "paths" and insert -- paths. --, therefor.

In Column 4, Line 2, after "having", delete "with".

In Column 4, Line 5, delete "FIG. 5b" and insert -- FIG. 5b. --, therefor.

In Column 4, Line 6, after "FIG. 5c" insert -- a --.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,451,147 B2

In the Specification

In Column 4, Line 7, delete "fails" and insert -- fails. --, therefor.

In Column 5, Line 9, delete "Data sources 112" and insert -- Data sources 102 --, therefor.

In Column 5, Line 35, delete "input blocks 102" and insert -- input blocks 104 --, therefor.

In Column 6, Line 10, delete "RB1, RB1,..." and insert -- RB1, RB2,... --, therefor.

In Column 10, Line 21, delete "B$\geq$0.5." and insert -- B$\leq$0.5. --, therefor.

In Column 14, Line 8, delete "for to" and insert -- for --, therefor.